Patented Oct. 21, 1924.

1,512,751

UNITED STATES PATENT OFFICE.

ALFONS FAUSTEN, OF COLOGNE-ON-THE-RHINE, GERMANY, ASSIGNOR TO DEUTSCHE-SPRENGSTOFF ACTIEN-GESELLSCHAFT IN HAMBURG, OF HAMBURG, GERMANY, A CORPORATION.

PROCESS FOR PRODUCING NONINFLAMMABLE CELLULOIDLIKE PRODUCTS.

No Drawing. Application filed May 29, 1923. Serial No. 642,362.

*To all whom it may concern:*

Be it known that I, ALFONS FAUSTEN, a subject of the German Republic, residing at Cologne-on-the-Rhine, Germany, have invented certain new and useful Improvements in the Processes for Producing Noninflammable Celluloidlike Products, of which the following is a specification.

The invention relates to improvements in the process for producing non-inflammable celluloid-like products, such as films used for projecting animated pictures upon a screen and the like.

It is well known that films made of acetyl-cellulose are far inferior to those made from nitro-cellulose as regards toughness. Acetyl-cellulose films when stored for any length of time are furthermore liable to split off acetyl groups, which fact still further increases their brittleness and also reduces the sensitiveness to light of the photographic layer.

The object of my invention is the elimination of this drawback. My invention consists in adding to the gelatinized acetyl-cellulose or its solution in acetone, acetic ether, alcohol, benzole and the like or mixtures of these solvents a small quantity, up to 5%, of a nitro-cellulose, which possesses low viscosity and which is easily highly soluble in the solvent chosen for the acetyl-cellulose.

It is a surprising fact that this addition does not increase the inflammability of the product made from this mixture as compared with those made from pure acetyl-cellulose, while the toughness and strength is considerably increased and the decomposition of the acetyl-cellulose and the injurious effect upon the layer of emulsion is considerably delayed.

In order to bind the acetyl groups splitting off at higher temperatures acetyl group binding agents are added to the mixtures, such as amyl alcohol, which latter at the same times serves as softening agent and imparts increased flexibility to the finished product.

What I claim as my invention and desire to secure by Letters Patent is:—

1. The process for producing non-inflammable celluloid-like products, which consists in adding to gelatinized acetyl-cellulose an amount not exceeding five per cent of nitrocellulose.

2. The process for producing non-inflammable celluloid-like products, which consists in adding to a solution of aceyl-cellulose an amount up to five per cent of nitro-cellulose.

3. The process for producing non-inflammable celluloid-like products, which consists in adding to a solution of acetyl-cellulose an amount up to five per cent of a nitro-cellulose, which is of low viscosity and which is easily and highly soluble in the solvent employed for the acetyl-cellulose.

4. The process for producing non-inflammable celluloid-like products, which consists in adding to a solution of acetyl-cellulose an amount up to five per cent of a nitro-cellulose, which is of low viscosity and which is easily and highly soluble in the solvent employed for the acetyl-cellulose and adding an acetyl group binding agent to said mixture.

5. The process of producing non-inflammable celluloid-like products, which consists in adding to gelatinized acetyl-cellulose an amount up to five per cent of a nitro-cellulose and adding amyl alcohol to such mixture.

In testimony whereof I have signed my name to this specification.

ALFONS FAUSTEN.